United States Patent
Tonelli et al.

(10) Patent No.: US 6,258,278 B1
(45) Date of Patent: Jul. 10, 2001

(54) HIGH PURITY WATER PRODUCTION

(75) Inventors: Anthony A. Tonelli, Dundas; Eric Harrison, Burlington; Susan Leanne Wesno, Hamilton; Hadi Husain, Brampton; Andrew Benedek, Toronto, all of (CA)

(73) Assignee: Zenon Environmental, Inc., Burlington (CA)

( * ) Notice: Subject to any disclaimer, the term of this patent is extended or adjusted under 35 U.S.C. 154(b) by 0 days.

(21) Appl. No.: 09/330,641

(22) Filed: Jun. 11, 1999

Related U.S. Application Data (63) Continuation-in-part of application No. 08/944,082, filed on Oct. 4, 1997, now Pat. No. 6,027,649, and a continuation-in-part of application No. 08/808,993, filed on Mar. 3, 1997.

(51) Int. Cl.$^7$ .................................................. B01D 61/00
(52) U.S. Cl. .................. 210/652; 210/651; 210/638; 210/900; 210/641; 210/85; 210/746; 210/96.1
(58) Field of Search .................. 210/651, 652, 210/900, 638, 257.2, 195.2, 87, 641, 742, 746, 138, 85, 96.1

(56) References Cited

U.S. PATENT DOCUMENTS

| | | |
|---|---|---|
| 3,462,364 | 8/1969 | Carlson . |
| 3,474,032 | 10/1969 | King . |
| 4,495,067 | 1/1985 | Klein et al. ............................ 210/87 |
| 4,528,093 | 7/1985 | Winer .................................. 210/96.2 |
| 4,574,049 | 3/1986 | Pittner ................................. 210/639 |
| 4,587,518 | 5/1986 | King .................................... 340/603 |
| 4,772,385 | 9/1988 | Yamada et al. ....................... 210/87 |
| 4,830,757 | 5/1989 | Lynch et al. ......................... 210/742 |
| 4,897,091 | 1/1990 | Pasternak et al. . |
| 4,937,557 | 6/1990 | Tucci et al. .......................... 340/603 |
| 5,024,766 | 6/1991 | Mahmud .............................. 210/668 |
| 5,061,374 | 10/1991 | Lewis ................................... 210/638 |
| 5,078,755 | 1/1992 | Tozawa et al. . |
| 5,106,754 | 4/1992 | Steele et al. ......................... 436/146 |
| 5,116,509 | 5/1992 | White .................................. 210/644 |
| 5,156,739 | 10/1992 | Dawson et al. ................... 210/321.8 |
| 5,250,183 | 10/1993 | Sawada et al. ...................... 210/652 |
| 5,254,143 | 10/1993 | Anazawa et al. ........................ 95/46 |
| 5,306,427 | 4/1994 | Xu ....................................... 210/640 |
| 5,338,456 | 8/1994 | Stivers ................................. 210/652 |
| 5,340,468 | 8/1994 | Hawthorne et al. ................. 210/96.1 |
| 5,362,383 | 11/1994 | Zimmerman et al. ................. 210/85 |
| 5,385,664 | * 1/1995 | Oinuma et al. . |
| 5,396,178 | 3/1995 | Rybarski ............................. 324/439 |
| 5,413,763 | 5/1995 | Jeffers ................................. 422/80 |
| 5,580,444 | 12/1996 | Burrows ................................ 210/85 |
| 5,651,894 | 7/1997 | Boyce et al. ........................ 210/652 |
| 5,766,479 | 6/1998 | Collentro et al. ................... 210/639 |
| 5,925,255 | * 7/1999 | Mukhopadhyay . |
| 5,997,745 | * 12/1999 | Tonelli et al. . |

FOREIGN PATENT DOCUMENTS

| | | |
|---|---|---|
| 57-222155 | * 6/1984 | (JP) . |
| 22802 | 1/1990 | (JP) . |
| 1-46643 | * 9/1990 | (JP) . |
| 422490 | 1/1992 | (JP) . |
| 4176303 | 6/1992 | (JP) . |

OTHER PUBLICATIONS

Mukhopadhyay et al, "Membranes–RO System That Reduces Membrane Scaling and Fouling Tendencies", Ultrapure Water, Oct. 1997, pp. 21–30.

McGarvey, F.X. and Ziarkowski, S.M., "Dealkalization of Water Supplies", presented at 19th Annual Liberty Bell Corrosion Course, Sep. 29, 1981, Philadelphia Pennsylvania.

* cited by examiner

*Primary Examiner*—Ana Fortuna
(74) *Attorney, Agent, or Firm*—Andrew Alexander (57) ABSTRACT

A method of producing high purity water using dealkalization and a double pass reverse osmosis membrane system having enhanced membrane life.

35 Claims, 2 Drawing Sheets

HIGH PURITY WATER PRODUCTION

CROSS REFERENCE TO RELATED APPLICATION

This application is a continuation-in-part of U.S. Ser. No. 08/944,082 filed Oct. 4, 1997, now U.S. Pat. No. 6,027,649, issued Feb. 22, 2000, and a continuation-in-part of U.S. Ser. No. 08/808,993, filed Mar. 3, 1997, incorporated herein by reference.

BACKGROUND OF THE INVENTION

This invention relates to water purification and more particularly it relates to an improved process for producing high purity water.

In using reverse osmosis, one problem is the scaling of the membrane resulting from deposition of materials such as calcium and magnesium compounds, for example, as well as other compounds and elements. Fouling of the membranes interferes with flux, greatly reducing the efficiency of the water purification system.

Another problem in producing high purity product water in a double pass reverse osmosis system is the difficulty in rejecting gases such as carbon dioxide and/or ammonia. Such gases pass through the membrane and re-establish an equilibrium in the permeate, adversely affecting product water resistivity.

The pH of feedwater to a double pass reverse osmosis is often controlled to a particular value to provide high resistivity water. However, a pH range of feedwater that produces high resistivity product water in one instance may not always produce high resistivity product water in another instance. That is, pH of feedwater to the first pass reverse osmosis has the problem that it does not always provide a control that produces high resistivity product water.

The presence of total alkalinity due mainly to bicarbonate, smaller amounts of carbonate, with small contributions by other ions and of carbon dioxide in the feedwater is responsible for significant changes in apparent rejection of salts and thus in the conductivity of product water from a double pass reverse osmosis system. As noted, reverse osmosis membranes are transparent to dissolved gases. Thus, $CO_2$ present in the feed side of the first pass membrane passes through the membrane to the interpass while bicarbonate and carbonate comprising total alkalinity is mostly rejected along with other anions and cations. This results in a change in the total alkalinity:$CO_2$ ratio, a loss of buffering capacity and causes a drop in pH from feed to interpass or permeate from the first membrane in a double pass reverse osmosis system. The same process is repeated from the interpass to the second pass product. The resulting change in the interpass pH can have the result of moving the interpass pH away from the pH which results in high resistivity product water from the second pass reverse osmosis unit. Thus, as noted, setting the pH of the feedwater to a fixed value for a double pass reverse osmosis does not always result in high resistivity product water.

In addition, when a particular pH is chosen for producing high resistivity water from a particular feedwater, changes in the feedwater composition, e.g., alkalinity, can render the chosen pH not optimum. Thus, lower quality product water results even though the feedwater has been maintained within a narrow pH range which was, at one time, thought to be optimum. Further, it will be appreciated that different membranes have the capacity to reject different ions to a lesser or greater extent. That is, some membranes reject anions better than cations and vice versa. When there is preferential rejection, there can be leakage of the other or opposite ion. pH of the feedwater has a large impact on the capacity of the particular membrane to reject the particular anion or cation. However, any membrane's performance can vary in a systematic way with pH to reach a peak value for rejection, and thereafter its performance declines on either side of an optimum pH.

Figure 2:
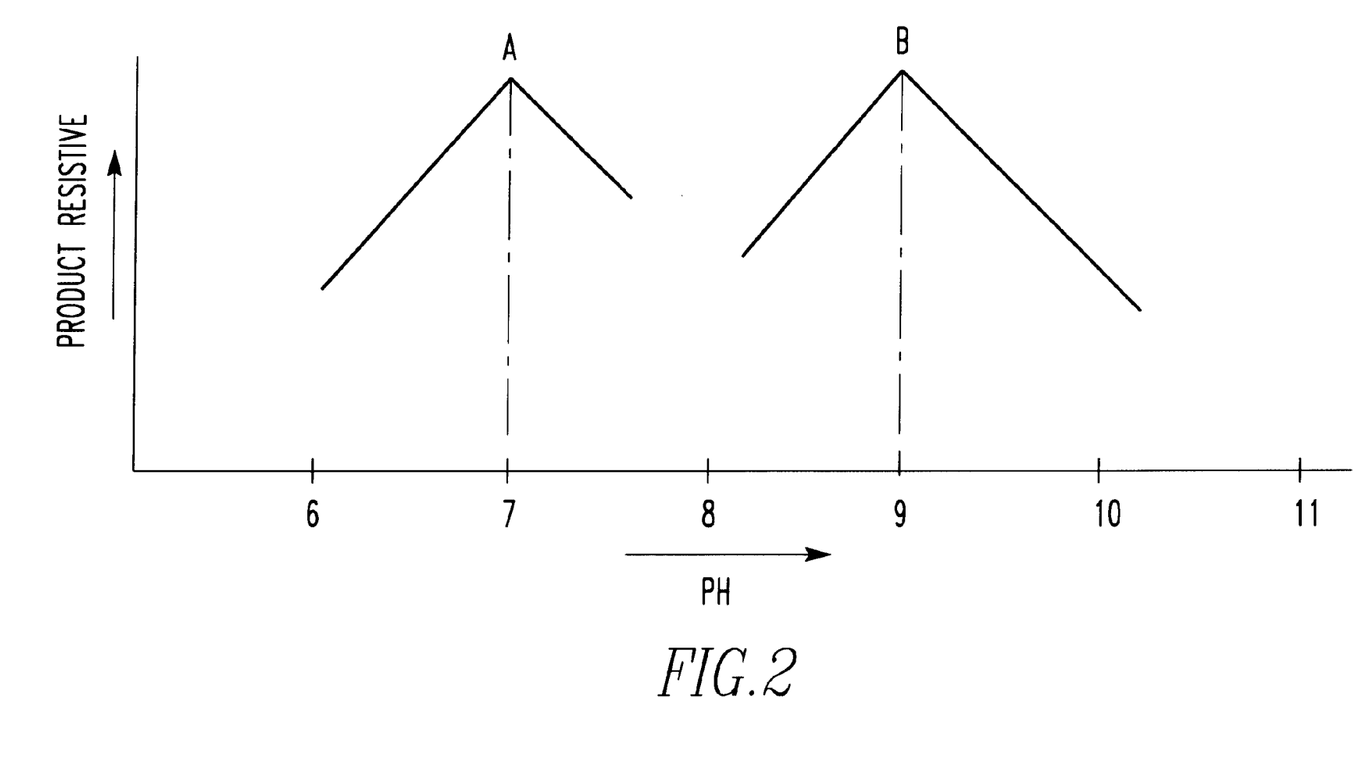
FIG. 2 is a schematic illustrating that different pH values can produce equivalent resistivity product water.

This concept is illustrated in FIG. 2 where A and B denote the highest resistivity for a given pH value. On either side of these points, resistivity declines. FIG. 3 also illustrates that different pH values can result in the same quality product water. However, on either side of the pH value, product quality declines. "A" can represent TDS and "B" high alkalinity. Further, the process is complicated by membrane selection. The negatively charged membrane of Fluid Systems Inc., referred to by the tradename HRRX membrane, operates in a pH range of 6.5 to 8 with a 99.4% rejection, while Toray's positively charged membrane, having the designation SU910S, operates at a pH of 9 to 9.5 with a 99.5% rejection. The lower pH is better for removing ammonia and the higher pH is better for removing carbon dioxide. Thus, it will be seen that there is a great need for a process which can be operated in a way which avoids these problems.

Attempts at removing carbon dioxide to provide high resistivity water in the past have only been partially successful and often end up further contaminating the water. For example, U.S. Pat. No. 4,574,049 discloses a process for removing carbon dioxide and other impurities from a water supply using double pass reverse osmosis membranes. The process includes providing a first reverse osmosis until having an inlet, a product outlet and a brine outlet; providing a second reverse osmosis unit having an inlet, a product outlet and a brine outlet; locating the second reverse osmosis unit downstream of the first reverse osmosis unit with the product outlet of the first reverse osmosis unit being coupled to the inlet of second reverse osmosis unit; providing water to be purified to the inlet of first reverse osmosis unit; treating the product from the reverse osmosis unit at a location upstream of second reverse osmosis unit with a chemical treatment agent comprising a solution having a pH that exceeds 7 to reduce carbon dioxide concentration of the product by chemical conversion and to ionize certain otherwise difficult to remove chemicals; and directing the product from second reverse osmosis unit toward a point of use or storage for purified water.

However, this process which normally uses sodium hydroxide for increasing the pH results in the addition of sodium which, because of its small ionic radius, is difficult to remove by subsequent membranes. Further, the addition of sodium hydroxide has another disadvantage in that the series of reactions removing carbon dioxide are relatively slow when compared to reverse osmosis unit contact time. Thus, the effectiveness of the operation is limited by the sodium hydroxide reactions, and further, this process does not remove ammonia.

U.S. Pat. No. 5,338,456 discloses a water purification process for removing dissolved solids of the type that are normally present in a municipal or similar water supply. The process uses a forced draft decarbonator having an inlet and a product outlet, a vacuum degasifier having an inlet, a product outlet and a water level sensor, and a reverse osmosis unit having an inlet, a product outlet and a brine outlet. The vacuum degasifier is located downstream of the forced draft decarbonator with the product outlet of the forced draft decarbonator being coupled to the inlet of the vacuum degasifier. The reverse osmosis unit is located downstream of the vacuum degasifier with the product outlet of the vacuum degasifier being coupled to the inlet of the reverse osmosis unit. Water to be purified is provided to the inlet of the forced draft decarbonator at a predetermined rate. According to the invention, the rate at which water to be purified is a provided to the inlet of the forced draft decarbonator is a function of a predetermined water level in the vacuum degasifier.

Japanese Patent 4-22490 discloses a pre-stage reverse osmosis membrane module, a post-stage reverse osmosis membrane module and a hydrophobic porous membrane module, to which an aqueous alkali solution circulating line is attached in the permeate side. That is, Japanese Patent 4-22490 utilizes an alkali solution in the permeate side to remove dissolved carbon dioxide by chemical reaction. The hydrophobic porous membrane module is placed between the pre-stage module and the post-stage module and has pores capable of permeating only gases. An inert gas blowing pipe is installed to the alkali aqueous solution circulating line.

Japanese Patent 2-2802 discloses reverse osmosis separator membrane module and degassing membrane module arranged in treating water line in series. The degassing membrane is formed by a porous supporter layer and high molecular homogeneous layer or minute layer arranged on the supporter layer. Oxygen separating. coefficient of the degassing membrane is not less than 1.3.

U.S. Pat. No. 4,897,091 discloses that gases such as carbon dioxide may be separated from rich liquor (such as methanol containing carbon dioxide) by passage of gas through a membrane which is the reaction product of (i) a polyamine and (ii) a polyisocyanate or a poly (carbonyl chloride).

U.S. Pat. No. 5,078,755 discloses removing dissolved gas from liquid, which comprises bringing the liquid containing the gas dissolved therein into contact with a membrane, thereby causing the dissolved gas to selectively permeate the membrane. The membrane is a permselective, composite membrane composed of a porous support and a nonporous, active membrane of a synthetic resin formed on the porous support, or is a permeable membrane having such characteristics that the nitrogen gas permeation rate at 30° C. is in the range from $7 \times 10^{-4}$ to $2 \times 10^{-2}$ $Nm^3 m^2 \cdot h \cdot atm$ and that the amount of permeated stream is 100 g/m²·h or less when 20° C. water is supplied to the membrane under atmospheric pressure while maintaining the pressure on its permeate side at 40 mm Hg.

U.S. Pat. No. 5,106,754 discloses that total organic carbon (TOC) and total inorganic carbon (TIC) monitoring of water is useful in determining the water quality. Conventional TOC and TIC monitoring techniques are not zero gravity compatible. The addition of microporous hydrophobic bladders in combination with a non-dispersive infrared analyzer allow for a two-phase, liquid and gas, zero gravity compatible TOC monitoring technique.

U.S. Pat. No. 5,116,507 discloses a method of treating an aqueous liquor, such as effluent liquor formed during coal gasification. The method comprises subjecting the liquor to dephenolation and ammonia stripping treatment to remove phenolic compounds and "free" ammonia from the liquor and then subjecting the resulting liquor, which still contains ammonium compounds and thus "fixed" ammonia, to reverse osmosis treatment to produce a permeate which is substantially free from impurities, including fixed ammonia.

U.S. Pat. No. 5,250,183 discloses an apparatus for manufacturing ultra-pure water, characterized in that a decarbonator/degassor and a reverse osmosis equipment for pretreatment of supply water are installed in the upper stream of a multiple effect evaporator.

U.S. Pat. No. 5,254,143 discloses a diaphragm for gas-liquid contact comprising a membrane having two surfaces, at least one surface of the membrane is hydrophilic and surfaces of micropores present in the membrane are hydrophobic. The diaphragm is used in contact apparatus in which a liquid is contacted with the hydrophilic surface of the membrane and a gas is contacted with the other surface.

U.S. Pat. No. 5,306,427 discloses a process for the separation of one or more, more permeable components from one or more, less permeable components in a feed stream. The process suggests two membrane separation stages in series wherein the feed is introduced into the low pressure side of the first stage, the permeate stream from the first stage is compressed and introduced into the high pressure side of the second stage and wherein the non-permeate stream from the second stage is recycled to the high pressure side of the first stage.

U.S. Pat. No. 5,413,763 discloses a method and apparatus for the measurement of the total organic carbon (TOC) content of a liquid. The inorganic carbon in the liquid is converted into carbon dioxide and removed from it. At the same time, oxygen is added to the liquid. The liquid is then exposed to ultraviolet radiation and the organic carbon thereby oxidized.

Japanese Patent 4-176303 discloses a gas-permeable membrane module containing a hollow fiber-shaped hydrophobic gas-permeable membrane used to remove the gas dissolved in a liquid. The liquid is supplied from an inlet, passed through the inside of the membrane from the membrane opening and sent to the other end of the membrane. A carrier gas is introduced from an outlet, passed around the bundle of the membranes and discharged from an outlet. The outlet is connected under these conditions to a vacuum source such as a vacuum pump, hence the gas dissolved in the liquid permeates through the membrane to the outside, and degasification is performed with high efficiency.

In U.S. Pat. No. 5,156,739, it is disclosed that water to be purified and degassed is passed through a reverse osmosis step from which a pure water stream and a high pressure waste water stream are produced. The high pressure waste water is passed through an eductor to produce a vacuum. The pure water stream is passed into a first volume of a degassifier and the vacuum is directed to a second volume of the degassifier. The first and second volume of the degassifier are separated by a hydrophobic membrane.

U.S. Pat. No. 5,670,053 discloses a process for purifying water including removing cations, anions and carbon dioxide and/or ammonia from water feed stream to produce high purity water having a resistivity of greater than 1 megohm-cm comprising the steps of providing a water feed stream to be purified, the stream containing cations, anions and carbon dioxide and/or ammonia; introducing the water feed stream to a high pressure side of a first reverse osmosis membrane module; passing water through the first reverse osmosis membrane to provide a first retentate having cations and anions concentrated therein and a first permeate depleted in cations and anions and containing carbon dioxide and/or ammonia; adding the first permeate to a high pressure side, of a gas permeable hydrophobic membrane module; passing carbon dioxide and/or ammonia through the gas-permeable membrane from the first permeate in the high pressure side of the gas-permeable hydrophobic membrane to provide a carbon dioxide and/or ammonia permeate on a low pressure side of the hydrophobic membrane and to provide a carbon dioxide and/or ammonia depleted retentate thereby removing carbon dioxide and/or ammonia from the first permeate; transferring the carbon dioxide and/or ammonia depleted retentate to the high pressure side of a second reverse osmosis membrane; and further purifying the carbon dioxide and/or ammonia depleted retentate by passing at least a portion thereof through the second reverse osmosis membrane to provide a second retentate and a second permeate, the second permeate having low levels of carbon dioxide and/or ammonia and having a resistivity greater than 1 megohm-cm.

U.S. Pat. No. 5,766,479 discloses a process for purifying water by removing dissolved materials therefrom, the process capable of producing purified water having a resistivity in the range of 2 to 10 megohm-cm. The process comprises providing a water feed stream to be purified and adjusting the pH of the water feed stream to a basic alkaline water solution to drive the equilibrium of a first weakly ionized material to become ionized in the basic solution. The basic water solution is introduced to a high pressure side of a first reverse osmosis membrane module and water is passed through the first reverse osmosis membrane to provide a first retentate having ions therein from the first weakly ionized material concentrated therein and a first permeate depleted in ions from the first weakly ionized material. The pH of the first permeate is adjusted to an acidic water solution to drive the equilibrium of a second weakly ionized material to become ionized in an acidic solution. The acidic water solution is transferred to the high pressure side of a second reverse osmosis membrane and the acidic water solution is purified by passing at least a portion thereof through the second reverse osmosis membrane to provide a second retentate containing ions of the second weakly ionized material ionized in the acidic solution and provide a second permeate depleted in the ions from the second weakly ionized material, the second permeate having a resistivity in the range of 1 to greater than 10 megohm-cm.

In spite of these prior processes, there is still a need for an improved process for producing high purity water, particularly in a double pass membrane system.

SUMMARY OF THE INVENTION

It is an object of this invention to provide an improved process for producing high purity water, for example, having a resistivity of 0.8 megohm-cm or greater.

It is another object of the invention to provide an improved process for producing high purity water using a double pass reverse osmosis membrane system having improved flux.

And yet, it is another object of the invention to provide an improved process for producing high purity water on a continuous basis using a pretreated feedwater being substantially free of alkalinity and carbon dioxide.

These and other objects will become apparent from a reading of the specification and claims appended hereto.

In accordance with these objects, there is provided a method of producing high purity water using a reverse osmosis membrane system having enhanced membrane life, the method comprising providing a feedwater to be purified and treating the feedwater with a strong base anion resin for purposes of dealkalization to remove ions including bicarbonate, carbonate, sulfate and nitrate ions to provide a dealkalized water containing ions having a major portion comprised of sodium and chloride ions. Thereafter, carbon dioxide is removed from the dealkalized water to provide dealkalized and decarbonated water. The decarbonated water is maintained at a pH in the range of 6 to 9.5. A first membrane module is provided having a first high pressure side and a first low pressure side separated by a first membrane and the dealkalized, decarbonated water is introduced to the first high pressure side of the first membrane to produce a first permeate in the first low pressure side to provide a permeate having a pH in the range of about 6.5 to 7.5. A second membrane module is provided having a second high pressure side and a second low pressure side separated by a second membrane and the first permeate is introduced to the high pressure side of the second membrane module and water is passed through the second membrane to produce the high purity water in the low pressure side of the second membrane.

DETAILED DESCRIPTION OF THE PREFERRED EMBODIMENTS

Figure 1:
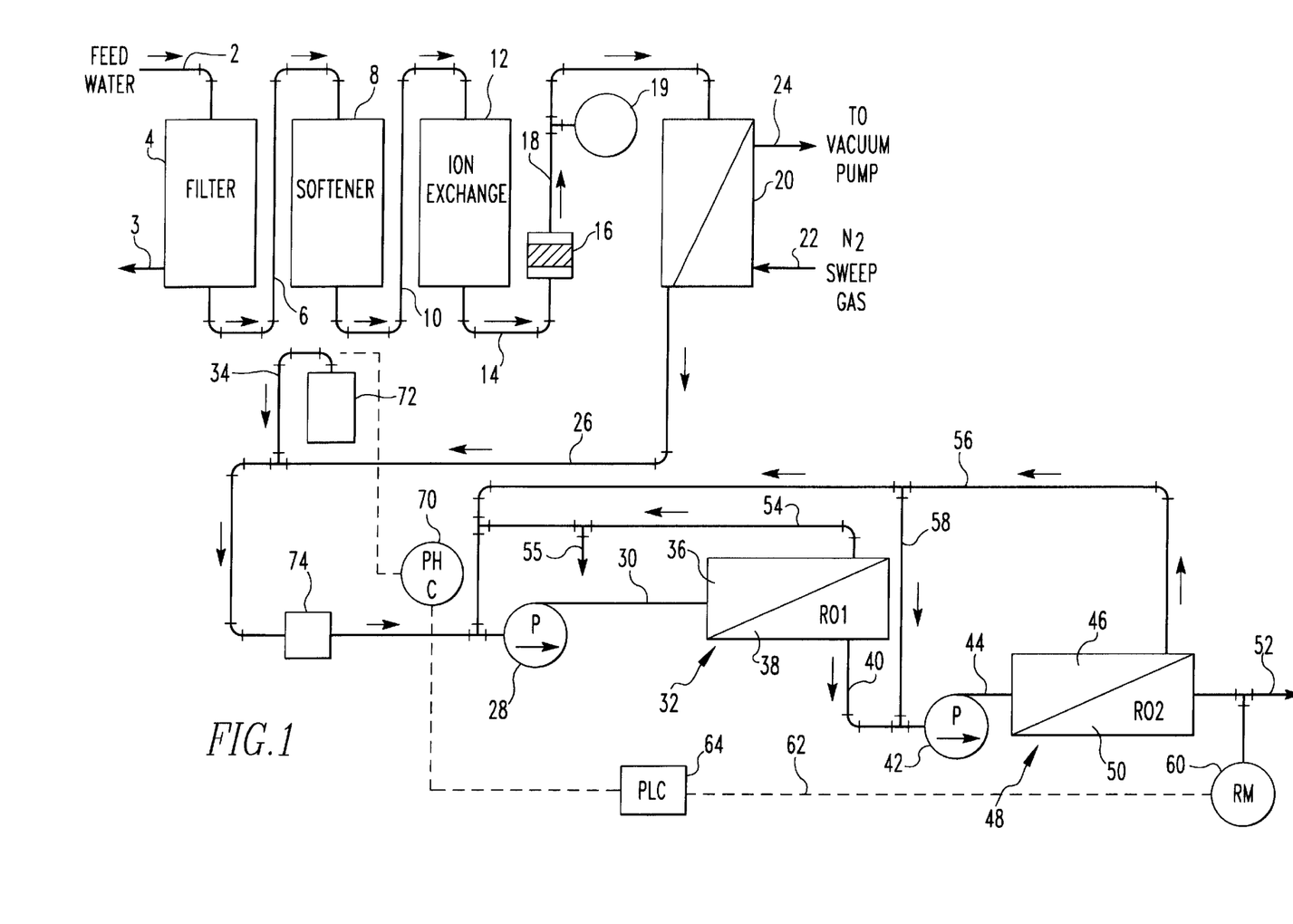
FIG. 1 is a flow chart of the process of the invention showing an ion exchange system in combination with double pass reverse osmosis modules for producing high purity water.

In the present invention, feedwater or raw water is introduced to the purification system along line 2. The feedwater may first be introduced to multi-media filter 4 to remove suspended solids greater than about 15 to 25 $\mu$m in diameter prior to processing. The filtered water is then transferred along line 6 to an optional water softening operation 8 where excess hardening constituents such as calcium, magnesium, barium and strontium can be removed. The use of water softening operation 8 depends to a large extent on the source of the feedwater and the amount of hardening constituents contained therein. That is, water softener 8 can be used if the water contains excessive hardening constituents.

After the softening operation, the feedwater is directed along line 10 to an ion exchange system 12 where substantially all of the alkalinity is removed. Preferably, alkalinity removal or dealkalization is accomplished by strong base anion exchange where substantially all of the ions contributing to the alkalinity, e.g., bicarbonate, are removed in accordance with the following reaction, for example:

R is the ion exchange resin. Salts of strong acids such as sulfates are also exchanged. Thus, substantially complete dealkalization or substantially all the ions contributing to alkalinity are removed and replaced by sodium ions. By the term "substantially complete dealkalization or substantially all the ions contributing to alkalinity are removed" is meant that no more than 1 to 2 ppm bicarbonate contributing to alkalinity remains. Thus, the major portion of the ions remaining in the feedwater after softening and dealkalization are sodium ions and chloride ions. It should be noted that sulfates, nitrates and carbonates are also removed in accordance with the above reaction and are replaced with chloride ions. The use of strong base anion exchange has the advantage that it can be regenerated using sodium chloride or with mixtures of sodium chloride and a small amount of sodium hydroxide. Thus, it will be seen that strong chemicals are not required in the process.

After ion exchange to remove substantially all the alkalinity, the process water is removed along line 14. The dealkalized water leaving ion exchange system 12 along line 14 has a pH in the range of about 4 to 6 with a typical pH being in the range of 4.5 to 5.5. The process water may be filtered with cartridge filter 16 to remove particles from the ion exchange resin from the process water. Thereafter, process water is removed along line 18 to unit 20 where it is treated for purposes of removing gases therefrom, particularly carbon dioxide gas.

Any method can be used to remove carbon dioxide gas that is effective in providing process water substantially free of carbon dioxide before addition to a first membrane module. For purposes of enhancing removal of carbon dioxide, the pH of the process water entering degassing unit 20 should be provided in the range of 4.5 to 8 and typically 4.6 to 6 where carbon dioxide gas is more prevalent. As noted, typically, the pH of the process water emanating from ion exchange system 12 is in the range of 4 to 6. However, acid optionally may be added at 19 to adjust the process water to a pH in the range of 4.3 to 4.5 to ensure the presence of gaseous $CO_2$ for purposes of removal.

The process water from ion exchange system 12 can be degassed by providing a vacuum on one side of a microporous, hydrophobic membrane, such as available from Hoescht-Celanese under the trade name Liqui-Cel® which provides for gas-liquid separation. The degassing may be accomplished using a vacuum and a gas purge using nitrogen or air. In degassing unit 20, at least 99% of the free carbon dioxide is removed. Preferably, substantially all of the carbon dioxide is removed to provide process feedwater containing less than 1ppm and preferably less than 0.5 ppm carbon dioxide in the process feedwater. As noted, the vacuum is obtained by flowing gases such as nitrogen or air through line 22 and removing the gases along line 24.

It will be appreciated that removing carbon dioxide from the dealkalized process water will operate to change the pH from acidic conditions towards neutral conditions, e.g., pH of 7, as carbon dioxide is removed.

A second degassing unit (not shown) may be provided in line 26 for purposes of removing ammonia gas. For purposes of removing ammonia gas, the retentate from degassing unit 20 can have the pH adjusted upwardly to a pH in the range of about 8 to 10 to favor removal of ammonia gas. It should be understood that the order of removing carbon dioxide and ammonia gas can be reversed.

After the degassing step, the process water is directed along line 26 to pump 28 and along line 30 to first membrane module 32.

The process feedwater introduced to membrane module 32 has a controlled level of constituents to be removed by the membrane modules. That is, as noted, the process feedwater for introduction to membrane module 32 is substantially free of alkalinity and also free of carbon dioxide. In addition, the process feedwater for introduction to first membrane module has a conductivity in the range of 30 to 1000 micro-Siemens, preferably 100 to 750 micro-Siemens. Further, the process water supplied to first membrane module 32 has total dissolved solids in the range of 40 to 600 ppm, preferably 50 to 500 ppm. The major portion of dissolved solids is comprised of sodium and chloride ions. That is, 60 to 95% of the total dissolved solids are made up of sodium and chloride ions.

The process water supplied to first membrane module 32 is maintained at a pH in the range of 6 to 9.5, preferably 6.5 to 8.5 and typically 6.5 to 7.7. To maintain the pH of process water supplied to membrane module 32 in the desired pH range, sodium hydroxide 72 can be supplied along line 34 from sodium hydroxide supply 72.

Pump 28 supplies process water along line 30 to high pressure side 36 of first reverse osmosis or membrane module 32. Permeate from low pressure side 38 is directed along line 40 through pump 42 and along line 44 to high pressure side 46 of second membrane module 48. Permeate or product water is removed along line 52 from low pressure side 50.

Retentate from first membrane module 32 may be recycled along line 54 and added to line 26 for reprocessing in first membrane module 32. Thus, there can be a improved recovery of process water in first membrane module 32. In addition, retentate from high pressure side 46 of second membrane module 48 may be returned along line 56 and can be introduced along line 58 to second membrane module 48 or returned to line 26 to be introduced to first membrane module 32. If desired, retentate from second membrane module 48 can be divided to be introduced to both first and second membrane modules. Any bleed-off from the system can be removed along line 55. By returning the retentate from both first and second membrane modules, the process provides for high recovery, e.g., greater than 90% and typically 90 to 98% recovery for most feedwaters.

For purposes of aiding in producing high purity or high resistivity water, the pH to the first membrane module may be controlled by using the product water resistivity measurements. That is, a resistivity monitor 60 is placed in line 52 to monitor the quality of the water leaving or emanating as permeate from second reverse osmosis unit 48 and the resistivity of the water is measured. The resistivity measurement is then relayed to a programmable logic controller 64 along line 62. The programmable logic controller is set to compare the present resistivity measurement to previous resistivity measurements. The programmable logic controller then determines whether the pH of the feedwater to the first membrane module should remain the same or should be adjusted upwardly or downwardly to maintain or improve the resistivity of the product water. If the determination is made by programmable logic controller 64 that the pH of the feedwater should be adjusted upwardly, then a signal is sent to pH controller 70 which in turn signals for more sodium hydroxide, for example, to be introduced from container 72 along line 34 to line 26. This adjusts the pH of the process water in line 26 upwards as required by the resistivity measurement of the product water from reverse osmosis unit 48. A static mixer may be provided to ensure that the sodium hydroxide is uniformly distributed in the process water prior to measuring the pH of feedwater by pH meter 74 and transferring the process water to high pressure side 36 of reverse osmosis unit 32.

It will be appreciated that programmable logic controller 64 can be programmed to calculate the amount of sodium hydroxide to be introduced to the feedwater. If sodium hydroxide is already being introduced, programmable logic controller 64 can be programmed to calculate the additional amount of sodium hydroxide to be introduced to the process water. The pH of the feedwater can be monitored by pH meter 74 and the feedwater pH relayed to programmable logic controller 64 for determining the amount of sodium hydroxide to be added. Continuous monitoring of the process water or feedwater pH by meter 74 provides programmable logic controller 64 with information respecting the feedwater and permits determination by programmable logic controller 64 whether feedwater pH is increasing or decreasing.

Programmable logic controller 64 can be programmed to maintain the resistivity of the product water within a given range or it can be programmed to improve the resistivity continually within the range. That is, if the last change in feedwater pH was an increase in pH of 0.1, for example, and this improved resistivity, programmable logic controller 64 can be programmed to increase the pH again. The amount of increase would normally be smaller than the previous increase in pH. This function can be continued to obtain the highest purity water. However, these values must be maintained within controlled ranges. That is, additional amounts of sodium hydroxide can act to decrease resistivity. However, it should be understood that if the resistivity of the product water meets the desired value, no adjustment of pH would be necessary. Further, if sodium hydroxide is being added, then a lesser amount is added if it is desired to lower the pH.

In operation, the programmable logic controller makes the comparison, using stored values in memory, and for example a logic table (or any other suitable control algorithm), and decides whether pH should increase or decrease, and then sends a signal to the pH controller, to raise or lower the set-point on the pH controller. The basis for resetting the set-point can be an adjustable incremental change in the set-point value. During normal operation, steps or changes of as little as 0.01 pH units can typically be used. Implementation of the change is handled by the pH controller, which can be any suitable stand-alone PID or similar controller or can also be written in programmable logic controller code.

In the subject invention, the pH of the feedwater along with the resistivity of the product water greatly aids in determining the quality of water obtained from the system. The resistivity of the product water or permeate from the second reverse osmosis and its trend with time aids in determining or providing control for producing high purity water. Thus, for example, normally there is no need for interpass, i.e., between reverse osmosis units 32 and 48, additions of chemicals to change pH, for example, of the interpass or permeate from reverse osmosis unit 32, if the pH of the feedwater is controlled based on product water resistivity. That is, in the present invention, the pH of the feedwater is not fixed but can be moved upwardly or downwardly within the pH range of 6 to 9.5, depending on what direction results in the highest resistivity in the product water.

In the present invention, it is important that a range of resistivity of product water be used as a set point. Further, as noted, it is important that adjustment in pH be maintained within a controlled range. That is, it is known that a pH change can increase the resistivity of product water. However, too much change in pH towards acidity or basicity can result in poor quality or unacceptable product water. If an increase in pH results in lowering resistivity, then programmable logic controller 64 would respond to lower pH in the feedwater to determine if an increase in resistivity of the product water results. Additional changes in pH can be made in accordance with the invention until the highest resistivity is obtained within a set range. If a range of resistivity is set for product water, then the present invention can be controlled to manipulate the feedwater pH to provide the desired resistivity even with changes in pH values or composition of the initial feedwater.

The feedwater which can be purified to high levels of purity in the present invention can include surface water such as river water and water from reservoirs and lakes, for example. Generally, these sources of water contain magnesium, calcium, sodium, potassium, barium, aluminum and strontium cations with the magnesium and calcium usually being present at higher levels, depending on the source. Usually, ground water supplies contain calcium and magnesium as the primary cations and bicarbonate (with associated carbon dioxide) and sulfate as the primary anions. Sodium and chloride levels are usually less than 20 to 25% of the total cation and anion concentrations for ground waters.

Because of the presence of scale forming cations, such as magnesium and calcium, membrane scaling can occur in the primary reverse osmosis module 32. Thus, as noted earlier, it is preferred to pretreat the feedwater to remove the scale forming cations.

Softening and dealkalization enables process feedwater to first membrane module 32 to be maintained at a lower pH, for a given tap-water feed, than would be the case without dealkalization, and still obtain good product quality. Further, it enables second pass feed pH to be maintained at less than 7 to facilitate rejection of ammonia. Dealkalization or decarbonation can be used for purposes of limiting the upper value of the feed pH control setting and thereby the resulting interpass and product pH and product water alkalinity, particularly in tap-water feeds whose alkalinity tends to be high, or whose alkalinity rises seasonally above a base-line value.

Also, prior to softening or dealkalization, an activated carbon pretreatment may be provided to remove a portion of the naturally occurring materials and residual disinfectant such as chlorine and chloramine compounds which result from the addition of ammonia to water to reduce high trihalomethane levels resulting from chlorination and the reaction of chlorine with organics such as humic acid.

For purposes of pretreatment prior to the softening step, instead of using a multimedia filter as a pretreatment, hollow fiber filters may be used as microfilters to remove fines to an SDI (silt density index) of less than 3. Such hollow fiber filters are described, for example, in U.S. Pat. No. 5,639,373, incorporated herein by reference, and are available from Zenon Environmental Inc., Burlington, Ontario, Canada, under the trademark Zeeweed®. The hollow fiber membranes are suitable immersed in tank 4 and the purified water therefrom removed along line 6. The feedwater in tank 4 is preferably treated with a coagulant and a portion of the water along with excess floc removed from tank 4 along line 3. Air or other mixing means may be introduced at the bottom of tank 4 for purposes of thoroughly mixing the floc in the water. The air aids in maintaining fine floc through attrition and in cleaning the membrane fibers. When treating with floc, preferably the water is maintained at a pH in the range of 5 to 9, preferably 5.5 to 8.

Any coagulant may be used which precipitates colloidal impurities such as natural organic matter, turbidity, color causing compounds, metals, and compounds such as arsenates. The resulting floc formed offers a highly active surface area for the adsorption of soluble matter and other fine particulate matter, such as smaller organic molecules and viruses. Thus, the process of coagulation produces floc particles that can be easily filtered by a microfiltration or ultrafiltration membrane using the membrane hollow fibers, for example, resulting in the purification of the impure water.

Coagulants that are useful in the present invention include any coagulants that are effective in a pH range from about 5 to 9. Typically, the best results are obtained with ferric salts, such as ferric chloride. Other salts such as aluminum salts which include aluminum chloride, aluminum sulfate, aluminum potassium sulfate, and aluminum nitrate may be used. It should be noted that combinations of these salts can be used.

In the present invention, the concentration of floc maintained in the water in tank 4 is important to ensure high levels of removal of contaminants, particularly the natural organic matter. Thus, the concentration of floc maintained in tank 4 can range from 2 to 6 g/l with a preferred concentration being about 3 to 4 g/l. The ranges provided in this disclosure include all numbers within the range as if specifically set forth.

An important aspect of the present invention is that the floc is maintained in a fine particle size range of 0.2 to 10 microns, with a large portion of it being in the 0.5 to 5 micron range. This is obtained through mechanical attrition caused by agitation of tank 4 with air or mechanical means. The increase in surface area over the conventional coagulation-flocculation-sedimentation process is in the order of at least one magnitude. That is, it is important in the present invention to use small floc which is resistant to settling. Further, the pretreatment has the advantage that it minimizes fouling of the membranes down stream.

In another method of removing chloramine, sodium bisulfite may be added to the feedwater prior to softening or dealkalization for purposes of removing chlorine. That is, sodium bisulfite acts to break down chloramine to chloride and ammonia gas. The chloride ion is rejected by the reverse osmosis membrane. The ammonia gas becomes ionized in a pH range of 6 to 7 and will be rejected by the reverse osmosis membrane. Thus, it is preferred that the interpass permeate be maintained at a pH in the range of 6 to 7 in order that the reverse osmosis unit 48 can remove the ammonium ion. Also, because the feedwater to membrane module 32 is completely dealkalized and free of carbon dioxide, the pH of the feedwater entering reverse osmosis unit 32 can be lower resulting, in many instances, in a lower pH for the interpass permeate.

In the present invention, alkalinity in the feedwater resulting from bicarbonate, carbonate and minor amounts of other ions as well as carbon dioxide significantly affect rejection of salts and thus the level of conductivity or resistivity of the product water from a double pass reverse osmosis system. The presence of alkalinity and carbon dioxide result in poorer quality product water than would normally be predicted from rejection of sodium chloride only. Dissolved gases such as carbon dioxide pass through a reverse osmosis membrane while most of the alkaline material is rejected. This causes a drop in the pH of permeate from the first reverse osmosis by changing the alkalinity:carbon dioxide ratio. Thus, it will be seen that such change in pH in respect of interpass permeate may not be optimum for production of product water having a high resistivity. However, by monitoring product water resistivity in accordance with the invention, the feedwater can be adjusted to provide an interpass permeate having a pH in the range of 6 to 7.5 which permits production of product water having high resistivity. That is, at a pH in the range of 6 to 7.2, the ammonia gas becomes ionized and is easily rejected in reverse osmosis unit 48. The interpass permeate can be degassed or treated with acid to remove or directly ionize ammonia gas. The interpass permeate pH can be adjusted also with alkali or base material, buffer, a natural or synthetic material such as resin or zeolite, an electro or electrochemical ion exchange process. Also, the interpass permeate can be degassed using a hydrophobic membrane where a vacuum is provided on one side to remove gases through the membrane as described herein.

In the present invention, preferably the pH of the feedwater to reverse osmosis 32 is maintained in the range of 6.7 to 7.7 and typically 7 to 7.5. As noted, the pH of the feedwater can be adjusted by injecting a solution of caustic material from tank 72 along line 34 into line 26. This level of pH has the effect of ionizing residual carbon dioxide to facilitate its remove in first pass reverse osmosis 10.

While sodium hydroxide has been noted for pH adjustment, it will be appreciated that other bases that may be used include potassium hydroxide, sodium bicarbonate and sodium carbonate.

After the pH of the dealkalized and carbon dioxide depleted process water is adjusted, it is introduced to high pressure side 36 of reverse osmosis 32 where ionized material is mostly sodium and chloride, with a minor amount of other ions, are rejected and removed along line 54. The removal of these materials tend to cause a drop in pH for the interpass permeate. If ammonia is not removed earlier, it is important that the pH of the interpass permeate is changed in the direction which results in removal of ammonium ions and in optimum resistivity of product water.

Suitable membranes that can be utilized in reverse osmosis units 32 and 48 are available from Fluid Systems Inc. under the designation HRRX.

However, it will be appreciated that negatively charged, positively charged or neutral charged membranes may be used. When negatively charged membranes (available from Fluid Systems Inc. under the designation FT-30) are used in both membrane modules, the pH of the process water introduced to the high pressure side of first membrane module 32 should be in the range of 6.5 to 7.5 to provide an interpass pH typically about 7. When positively charged membranes are used in second membrane module 48, the pH of the permeate introduced to second membrane module 48 should be adjusted to a pH in the range of about 8 to 9.5, preferably 8.5 to 9.

In another aspect of the invention, the process feed water introduced to first membrane module 32 can be provided in a pH range of 6 to 7 for purposes of removing ammonia by first membrane module 32.

While reverse osmosis units 32 and 48 have been shown as single units, they can be comprised of multiple units in series or parallel with the retentate of the later reverse osmosis transferred back to feed of the earlier reverse osmosis unit as noted.

In the present invention, product water resistivity can be monitored and used to reset the set-point of a feedwater pH controller to increase or decrease pH of feedwater introduced to reverse osmosis unit 32. This changes the interpass permeate pH. Thus, the present invention has the advantage that it provides for a substantially constant composition of feedwater to be provided to first membrane module 32 and the membrane modules can be selected for effective rejection of remaining ions without extreme pH adjustments which add more ions to be removed. Further, because dealkalization occurs before the membrane, membrane life is greatly extended because of lower required feed pH and flux is maintained at a high level without fouling. In addition, dealkalization and carbon dioxide removal to substantially zero prior to the membrane modules permit high recovery of process water.

EXAMPLE

This example was performed using the system substantially as shown in FIG. 1. The membranes used were negatively charged, polyamide low pressure, high rejection membranes, manufactured by Fluid Systems Inc., under the designation HRRX having a rejection of 99.7% and 99.5% in the first and second membrane modules, respectively.

Feedwater was first dechlorinated by passage through a bed of activated carbon and the conductivity of the feedwater prior to softening and dealkalization was 300 micro-Siemens. The temperature of the feedwater was about 20° C. The softener and strong base anion ion exchange systems were regenerated prior to start of purification using sodium chloride. After the feedwater was passed through ion exchange system before degassing, it had a pH of about 4.8.

The feedwater was dealkalized with an alkalinity of less than 1 mg/l and after degassing, $CO_2$ was removed to about less than 0.5 ppm using a degassing membrane and nitrogen gas sweep. The pH of the process water introduced to the first membrane module was in the range of 7.2 to 7.4 and the interpass pH was in the range of 7 to 7.2. This test was run for a period of 3 hours and the pH of outlet water from the strong base anion exchange system rose to about 5.2. The conductivity of the process water being introduced to the first membrane module was about 550 micro-Siemens. The increase in conductivity resulted from the recycle. The process produced product water having a resistivity of about 3–4 megohms-cm for a period of 3 hours.

Thus, it will be seen that high purity water can be made using the process of the invention.

While the invention has been described in terms of preferred embodiments, the claims appended hereto are intended to encompass other embodiments which fall within the spirit of the invention.

What is claimed is:

1. A method of producing high purity water using dealkalization and reverse osmosis membrane systems having enhanced membrane life, the method comprising:
   (a) providing a body of feedwater to be purified;
   (b) adding a coagulant to said body to form a floc concentration in the range of 2 to 6 gm/l in a size range of 0.2 to 10 µm in said body for adsorbing contaminants thereon;
   (c) removing a portion of said body through a submerged semi-permeable membrane to provide a purified feedwater;
   (d) treating said purified feedwater with a strong base anion exchange for purposes of dealkalization to remove ions including bicarbonate, carbonate, sulfate and nitrate ions to provide a substantially completely dealkalized water containing ions having a major portion thereof comprised of sodium and chloride ions;
   (e) removing carbon dioxide from said dealkalized water to provide dealkalized, decarbonated water substantially free of carbon dioxide;
   (f) maintaining said decarbonated water at a pH in the range of 6 to 7.7;
   (g) providing a first membrane module having a first high pressure side and a first low pressure side separated by a first membrane;
   (h) introducing said dealkalized, decarbonated water to the first high pressure side of said first membrane and producing a first permeate in said first low pressure side to provide a permeate having a pH in the range of about 6.5 to 7.5;
   (i) providing a second membrane module having a second high pressure side and a second low pressure side separated by a second membrane; and
   (j) introducing said first permeate to the high pressure side of said second membrane module and passing water through said second membrane producing said high purity water having a resistivity greater than 0.8 microhm-cm in the low pressure side of said second membrane.

2. The method in accordance with claim 1 including the step of softening said water to remove excess hardness prior to dealkalizing said water with said strong base anion.

3. The method in accordance with claim 1 including maintaining said dealkalized water from said anion exchange and prior to carbon dioxide removal at a pH in the range of 4 to 6.

4. The method in accordance with claim 1 including maintaining said dealkalized water from said anion exchange and prior to carbon dioxide removal at a pH in the range of 4.5 to 5.5.

5. The method in accordance with claim 1 wherein said decarbonated water contains less than 0.1 ppm carbon dioxide.

6. The method in accordance with claim 1 wherein said dealkalized water contains less than 0.1 ppm bicarbonate.

7. The method in accordance with claim 1 including maintaining said decarbonated water for introduction to said first membrane module at a pH in the range of 6.7 to 7.7.

8. The method in accordance with claim 1 wherein the process water supplied to the first membrane module has a conductivity in the range of 30 to 1000 micro-Siemens.

9. The method in accordance with claim 1 wherein the process water supplied to the first membrane module has a conductivity in the range of 100 to 750 micro-Siemens.

10. The method in accordance with claim 1 wherein process water introduced to the first membrane module has total dissolved solids (TDS) of 40 to 600 ppm.

11. The method in accordance with claim 1 wherein process water introduced to the first membrane module has a total dissolved solids comprised 60 to 95% of sodium and chloride ions.

12. The method in accordance with claim 1 including returning retentate from first membrane module for re-introduction with process water to said first membrane module.

13. The method in accordance with claim 1 including returning retentate from second membrane module for re-introduction to at least one of the first or second membrane modules.

14. The method in accordance with claim 1 wherein 90 to 98% of the feedwater is processed into high purity water.

15. A method of producing high purity water using dealkalization and reverse osmosis membrane systems having enhanced membrane life, the method comprising:
   (a) providing a body of feedwater to be purified;
   (b) adding a coagulant to said body to form a floc concentration in the range of 2 to 6 gm/l in a size range of 0.2 to 10 µm in said body for purposes of adsorbing contaminants thereon;
   (c) removing a portion of said body through a submerged semi-permeable membrane to provide a purified feedwater;
   (d) treating said purified feedwater with a strong base anion exchange for purposes of dealkalization to remove at least one of the ions from the group consisting of bicarbonate, carbonate, sulfate and nitrate ions to provide a substantially completely dealkalized water containing ions having a major portion thereof comprised of sodium and chloride ions and having a pH in the range of 4 to 6;
   (e) removing carbon dioxide from said dealkalized water to provide dealkalized, decarbonated water substantially free of carbon dioxide;
   (f) maintaining said decarbonated water at a pH in the range of 6.7 to 7.7 and having a conductivity in the range of 100 to 500 micro-Siemens;

(g) providing a first membrane module having a high pressure side and a low pressure side separated by a first membrane;

(h) introducing said dealkalized, decarbonated water to the high pressure side of said first membrane and producing a first permeate in said low pressure side to provide a permeate having a pH in the range of about 6.5 to 7.5;

(i) providing a second membrane module having a high pressure side and a low pressure side separated by a second membrane; and (j) introducing said first permeate to the high pressure side of said second membrane module and passing water through said second membrane producing said high purity water having a resistivity greater than 0.8 microhm-cm in the low pressure side of said second membrane.

16. A method of producing high purity water using dealkalization and reverse osmosis membrane systems having enhanced membrane life, the method comprising:

(a) providing a body of feedwater to be purified;

(b) adding a coagulant to said body to form a floc in said body in a concentration range of 2 to 6 gms/l in a size range of 0.2 to 10 µm for purposes of adsorbing contaminants thereon;

(c) removing a portion of said body through a submerged semi-permeable membrane to provide a purified feedwater;

(d) treating said purified feedwater with an ion exchange for purposes of dealkalization to remove an ion from the group consisting of bicarbonate, carbonate, sulfate and nitrate ions to provide a substantially completely dealkalized water containing ions having a major portion thereof comprised of sodium and chloride ions and having a pH in the range of 4 to 6;

(e) removing carbon dioxide from said dealkalized water to provide dealkalized, decarbonated water substantially free of carbon dioxide;

(f) maintaining said decarbonated water at a pH in the range of 6.7 to 7.7 and having a conductivity in the range of 100 to 500 micro-Siemens;

(g) providing a first membrane module having a high pressure side and a low pressure side separated by a first membrane;

(h) introducing said dealkalized, decarbonated water to the high pressure side of said first membrane and producing a first permeate in said low pressure side to provide a permeate having a pH in the range of about 6.5 to 7.5;

(i) providing a second membrane module having a high pressure side and a low pressure side separated by a second membrane; and (j) introducing said first permeate to the high pressure side of said second membrane module and passing water through said second membrane producing said high purity water having a resistivity greater than 0.8 microhm-cm in the low pressure side of said second membrane.

17. A method of producing high purity water using dealkalization and reverse osmosis membrane systems having enhanced membrane life, the method comprising:

(a) providing a feedwater to be purified;

(b) treating said feedwater with a strong base anion exchange for purposes of dealkalization to remove ions including bicarbonate, carbonate, sulfate and nitrate ions to provide a substantially completely dealkalized water contaaing ions having a major portion thereof comprised of sodium and chloride ions;

(c) removing carbon dioxide from said dealkalized water to provide dealkalized, decarbonated water substantially free of carbon dioxide;

(d) maintaiing said decarbonated water at a pH in the range of 6 to 9.5;

(e) providing a first membrane module having a first high pressure side and a first low pressure side separated by a first membrane;

(f) introducing said dealkalized, decarbonated water to the high pressure side of said first membrane and producing a first permeate in said low pressure side having a pH in the range of about 6.5 to 7.5;

(g) providing a second membrane module having a high pressure side and a low pressure side separated by a second membrane;

(h) introducing said first permeate to the high pressure side of said second membrane module and passing water through said second membrane producing said high purity water having a resistivity greater than 0.8 microhm-cm in the low pressure side of said second membrane;

(i) measuring the resistivity of said high purity water produced at said second low pressure side of said second membrane module to provide a resistivity measurement;

(j) relaying said resistivity measurement to a programmable logic controller;

(k) in said programmable logic controller, comparing said resistivity measurement with a previous resistivity measurement to provide a comparson; and (l) in response to said comparison, maintaining or changing the pH of said dealkalized, decarbonated water upwardly or downwardly to produce said high purity water having said desired resistivity.

18. The method in accordance with claim 17 including the step of softening said water to remove excess hardness prior to dealkalizing said water with said strong base anion.

19. The method in accordance with claim 17 including maintaining said dealkalized water from said ion exchange and prior to carbon dioxide removal at a pH in the range of 4 to 6.

20. The method in accordance with claim 17 including maintaining said dealkalized water from said ion exchange and prior to carbon dioxide removal at a pH in the range of 4.5 to 5.5.

21. The method in accordance with claim 17 wherein said decarbonated water contains less than 0.1 ppm carbon dioxide.

22. The method in accordance with claim 17 wherein said dealkalized water contains less than 1 ppm bicarbonate.

23. The method in accordance with claim 17 including maintaining said decarbonated water for introduction to said first membrane module at a pH in the range of 6.7 to 7.7.

24. The method in accordance with claim 17 wherein the process water supplied to the first membrane module has a conductivity in the range of 30 to 1000 micro-Siemans.

25. The method in accordance with claim 17 wherein the process water supplied to the first membrane module has a conductivity in the range of 100 to 750 micro-Siemans.

26. The method in accordance with claim 17 wherein process water introduced to the first membrane module has total dissolved solids (TDS) of 40 to 600 ppm.

27. The method in accordance with claim 17 wherein process water introduced to the first membrane module has a total dissolved solids comprised 60 to 95% of sodium and chloride ions.

28. The method in accordance with claim 17 including returning retentate from first membrane module for re-introduction with process water to said first membrane module.

29. The method in accordance with claim 17 including retuning retentate from second membrane module for re-introduction to at least one of the first or second membrane modules.

30. The method in accordance with claim 17 including adjusting said pH of said process water introduced to said first membrane upwardly in response to a resistivity measurement to increase the resistivity measurement.

31. The method in accordance with claim 17 including providing a resistivity measurement range for said high purity water in said programmable logic controller, and in response to said resistivity measurement, changing the pH of said process water introduced to said first membrane module to maintain said resisfivity measurement of said high purity water in said resistivity measurement range.

32. The method in accordance with claim 17 including the step of maintaining said feedwater to be introduced to said first membrane module in a temperature range of 40 to 95° F.

33. The method in accordance with claim 17 including adding a coagulant to a body of said feedwater to provide a floc concentration in the range of 2 to 6 gm/l in a size range of 0.2 to 10 μm for adsorbing contaminants thereon and removing a portion of said body of water through a submerged semi-permeable membrane to provide purified feedwater for treating with said strong base anion exchange.

34. A method of producing high purity water using dealkalization and reverse osmosis membrane systems having enhanced membrane life, the method comprising:

(a) providing a feedwater to be purified;

(b) treating said feedwater with a strong base anion exchange for purposes of dealkalization to remove ions including at least one of the ions selected from the group consisting of bicarbonate, carbonate, sulfate and nitrate ions to provide a substantially completely dealkalized water containing ions having a major portion comprised of sodium and chloride ions and having a pH in the range of 4 to 6;

(c) removing carbon dioxide from said dealkalized water to provide dealkalized, decarbonated water substantially free of carbon dioxide;

(d) maintaining said decarbonated water at a pH in the range of 6.7 to 7.7 and having a conductivity in the range of 100 to 750 micro-Siemens;

(e) providing a first membrane module having a high pressure side and a low pressure side separated by a first membrane;

(f) introducing said dealkalized, decarbonated water to the high pressure side of said first membrane and producing a first permeate in said low pressure side to provide a permeate having a pH in the range of about 6.5 to 7.5;

(g) providing a second membrane module having a high pressure side and a low pressure side separated by a second membrane;

(h) introducing said first permeate to the high pressure side of said second membrane module and passing water through said second membrane producing said high purity water having a resistivity greater than 0.8 microhm-cm in the low pressure side of said second membrane, (i) measuring the resistivity of said high purity water produced at said second low pressure side of said second membrane module to provide a resistivity measurement;

(j) relaying said resistivity measurement to a programmable logic controller;

(k) in said programmable logic controller, comparing said resistivity measurement with a previous resistivity measurement to provide a comparison; and (l) in response to said comparison, maintaining or changing the pH of said dealkalized, decarbonated water upwardly or downwardly to produce said high purity water having said desired resistivity.

35. The method in accordance with claim 34 including adding a coagulant to a body of said feedwater to provide a floc concentration in the range of 2 to 6 gm/l in a size range of 0.2 to 10 μm for adsorbing contaminants thereon and removing a portion of said body of water through a submerged semi-permeable membrane to provide purified feedwater for treating with said strong base anion exchange.

* * * * *